US010902123B2

(12) United States Patent
Woodward et al.

(10) Patent No.: US 10,902,123 B2
(45) Date of Patent: Jan. 26, 2021

(54) REMEDIATION OF FLUSH RELOAD ATTACKS

(71) Applicant: McAfee, LLC, San Jose, CA (US)

(72) Inventors: Carl D. Woodward, Santa Clara, CA (US); Kunal Mehta, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 210 days.

(21) Appl. No.: 16/048,478

(22) Filed: Jul. 30, 2018

(65) Prior Publication Data

US 2020/0034538 A1 Jan. 30, 2020

(51) Int. Cl.
*G06F 21/00* (2013.01)
*G06F 21/56* (2013.01)
*G06F 21/54* (2013.01)

(52) U.S. Cl.
CPC ............ *G06F 21/566* (2013.01); *G06F 21/54* (2013.01); *G06F 2221/034* (2013.01)

(58) Field of Classification Search
CPC ...... G06F 21/54; G06F 21/566; G06F 21/577; G06F 2221/034
See application file for complete search history.

(56) References Cited

U.S. PATENT DOCUMENTS

| 9,436,603 | B1 | 9/2016 | Pohlack | |
|---|---|---|---|---|
| 2006/0090165 | A1* | 4/2006 | Martin | G06F 9/542 719/318 |
| 2011/0055388 | A1* | 3/2011 | Yumerefendi | G06F 11/3409 709/224 |
| 2013/0091571 | A1* | 4/2013 | Lu | G06F 21/563 726/23 |
| 2017/0091454 | A1 | 3/2017 | Sukhomlinov et al. | |
| 2017/0272452 | A1* | 9/2017 | Kraemer | G06F 17/40 |
| 2017/0293546 | A1* | 10/2017 | Frontiero | G06F 11/302 |
| 2019/0130104 | A1* | 5/2019 | Carlson | G06F 3/0653 |
| 2019/0354680 | A1* | 11/2019 | De Lima Junior | G06N 20/00 |

OTHER PUBLICATIONS

Andreas Kleen, Intel® Transactional Synchronization Extensions (Intel® TSX) profiling with Linux perf, May 3, 2013, Modern Code, (Year: 2013).*
endgame.com Blog, "Detecting Spectre and Meltdown Using Hardware Performance Counters", Jan. 8, 2018, retrieved from internet on Nov. 4, 2019, retrieved from.
(Continued)

*Primary Examiner* — Joseph P Hirl
*Assistant Examiner* — Ka Shan Choy
(74) *Attorney, Agent, or Firm* — Patent Capital Group

(57) ABSTRACT

There is disclosed in one example a computing apparatus, including: a hardware platform including a performance monitoring unit (PMU); and one or more tangible, non-transitory computer-readable mediums having stored thereon executable instructions to provide a kernel space threat detection engine to: receive a PMU event; correlate the PMU event to a computer security threat including extracting artifacts from the PMU event, and correlating the artifacts to an artifact profile for a known attack; and identify a process associated with the PMU event as a potential attack.

20 Claims, 11 Drawing Sheets

(56) References Cited

OTHER PUBLICATIONS

International Search Report and Written Opinion in International Patent Application No. PCT/US2019/043852 dated Nov. 13, 2019, 12 pages.

Spisak, Matt, "Hardware-assisted rootkits: abusing performance counters on the ARM and x86 architectures", Published in: WOOT '16 Proceedings of the 10th USENIX Conference an Offensive Technologies, pp. 1-12, Aug. 8-9, 2016, retrieved from.

Zirak, Allaf et al., "ConfMVM: A Hardware-Assisted Model to Confine Malicious VMs", Published in: 2018 UKSim-AMSS 20th International Conference on Computer Modelling and Simulation (UKSim), pp. 4-54, Mar. 27-29, 2018, retrieved from.

"Flush+Reload: a High Resolution, Low Noise, L3 Cache Side-Channel Attack," Yarom et al., The University of Adelaide, 14 pages.

"Part Two: Detecting Meltdown and Spectre by Detecting Cache Side Channels," Capsule8 (https://capsule8.com/blog/author/capsule8/), Jan. 9, 2018, 5 pages, retrieved from the internet Jun. 26, 2018, https://capsule8.com/blog/detecting-meltdown-spectre.

"Side-Channel Attacks on Everyday Applications: Distinguishing Inputs with Flush+Reload," Homby, University of Calgary, 11 pages.

"Spectre and Meltdown explained: What they are, how they work, what's at risk," Fruhlinger, Jan. 15, 2018, CSO Online, 8 pages, retrieved from the Internet on Jun. 28, 2018, https://www.csoonline.com/article/3247868/vulnerability.

\* cited by examiner

REMEDIATION OF FLUSH RELOAD ATTACKS

BACKGROUND

The "Internet of things" (IoT) is a term that refers loosely to the many "smart" devices that are starting to become ubiquitous in society. These devices can appear, for example, in a home or office automation scheme.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
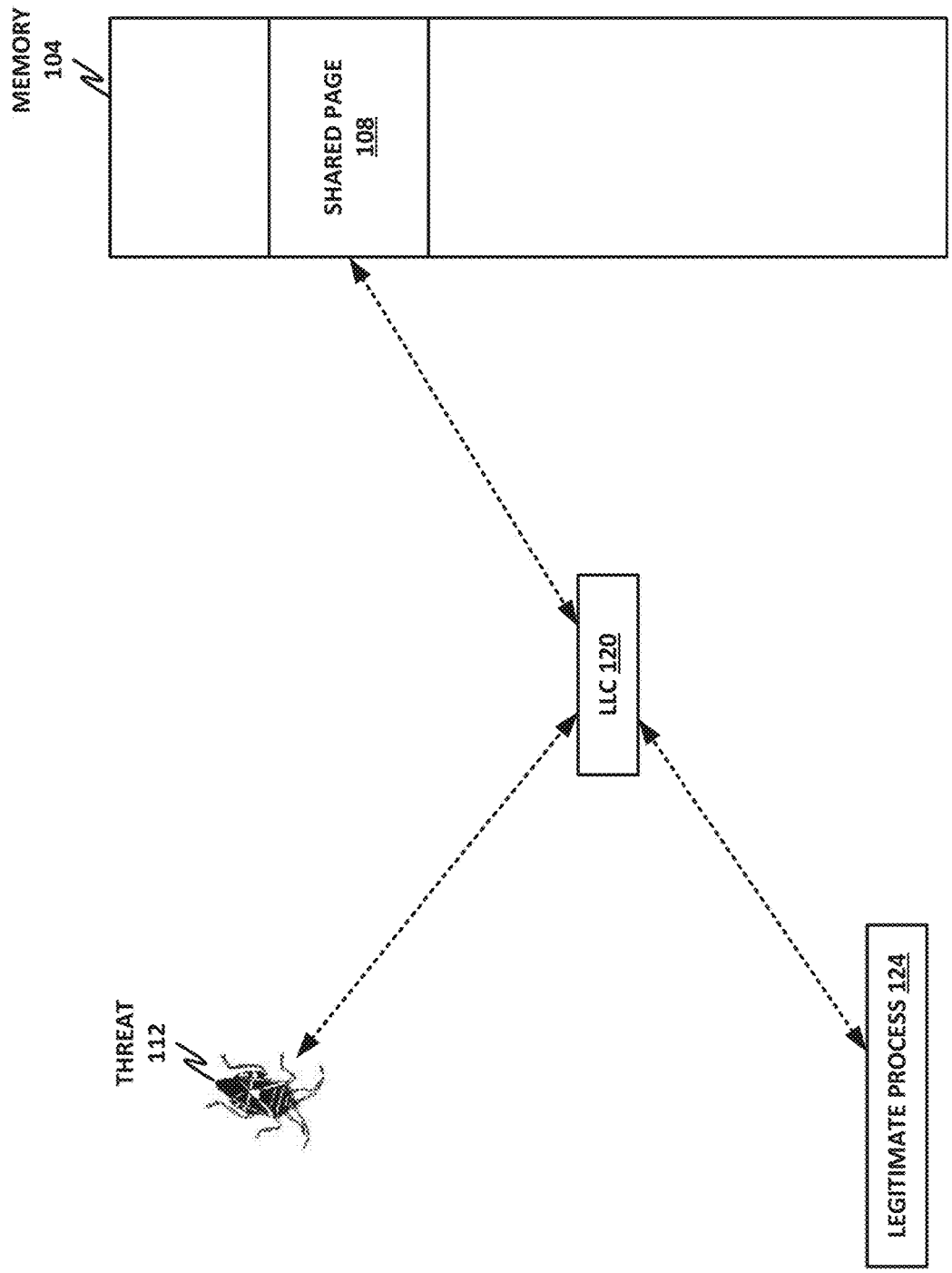
FIG. 1 is a block diagram of a cache flush reload side channel attack.

In an example, there is disclosed a computing apparatus, comprising: a hardware platform comprising a performance monitoring unit (PMU); and one or more tangible, non-transitory computer-readable mediums having stored thereon executable instructions to provide a kernel-space threat detection engine to: receive a PMU event; correlate the PMU event to a computer security threat comprising extracting artifacts from the PMU event, and correlating the artifacts to an artifact profile for a known attack; and identify a process associated with the PMU event as a potential attack.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The "Meltdown" and "Spectre" vulnerabilities that were first discovered in January, 2018 have been characterized as one of the most significant computer security threats in a generation. These vulnerabilities affect practically every microprocessor manufactured over a course of decades, and involve a malicious process gaining unauthorized access to data by exploiting a combination of speculative execution and caching. In speculative execution, a CPU may begin working on both branches of a conditional statement, or may speculatively compute a common process before it has been requested. Caching is simply a technique of storing data that are frequently used, or that are anticipated to be used in the near future, in a local fast memory instead of having to access the data from the much slower main memory each time.

Because modern computers execute multiple threads at one time, memory protection is a core concept of computer security. In other words, one thread should not be able to view or access the data of another thread. CPUs handle this permission issue with a privilege check. However, privilege checks are a relatively slow process, and thus can hinder speculative execution. Thus, in the speculative execution context, a CPU may fetch data from cache and begin executing on it, while in parallel performing the privilege check. Security is maintained by ensuring that the process that requested the data is not allowed to see the data until it passes the privilege check.

But because the data are stored in cache even if the requesting process never receives permission to access the data, and because the cache can be accessed more quickly than main memory, a malicious process may try to access certain memory locations simply to see whether they have been cached. Because cache operates much more quickly than main memory, the malicious process may determine that the data are privileged more quickly than if the data had to be fetched from memory. Thus, the malicious process can determine the address of data that have been stored in cache via a so-called "side channel attack." Meltdown and Spectre both exploit different aspects of this side channel attack method.

Fortunately, Meltdown and Spectre exploits are relatively technical and difficult, and as of the date of this writing, no known exploits have been found in the wild. But the extreme nature of the vulnerabilities is such that exploiting them is highly desirable for bad actors. So various patches and bug fixes have been rolled out to preemptively protect against such exploits. These patches and bug fixes, however, themselves cause substantial degradation in some systems.

It is therefore possibly advantageous for an antivirus provider to provide a deterministic, high-performance, and precise method for detecting exploits, such as a Meltdown and flush reload cache side channel attack. Embodiments of the disclosed system and method include the use of performance counters, static code analysis, heuristics, and pattern matching, by way of nonlimiting example.

The method disclosed herein may be capable of detecting and stopping an ongoing Meltdown attack, as well as being able to detect and stop a generic flush reload cache side channel attack. This method may realize advantages over existing fixes. For example, Microsoft has applied some patches to Meltdown, while Intel and other CPU vendors are working on fixes in microcode. These solutions, however, have shown some performance degradation in affected systems. Thus, an antivirus-type solution that can detect the attack without slowing down the system may provide advantages.

It is noted that flush reload cache side channel attacks generally have common code, assembly, and/or opcode patterns or sequences. When the attack executes, it creates significant variations (in a pattern) to some platform counters, such as total L3 cache miscount, total TSX exceptions aborted, and others. Thus, detecting an attack can begin with collecting artifacts of the event of the selected performance counter overflows, providing an opportunity to analyze the executing code. Some performance counters can trigger an interrupt, which provides an opportunity to analyze executing code in the context of attack execution. This makes the method more deterministic and precise, and also provides higher performance.

An example of the method includes programming a platform performance monitoring unit (PMU) to generate interrupts on some selected or relevant performance counters. In the case of a PMU interrupt triggered by these counters, other various artifacts of running (in-context) code, such as assembly sequence, opcodes, stack arguments, branches, register values, and exception records, by way of nonlimiting example, may then be correlated to the artifacts to find a pattern. When it is found that the pattern closely resembles a flush reload cache side channel attack, such as code sequencing, or a Meltdown-style attack, then the process may be designated as malicious and remedial action may be taken.

As of the date of this writing, there are no known software solutions by antivirus or security vendors that detect and stop ongoing Meltdown and other flush reload cache side channel attacks.

The methods taught in the present specification detect and prevent an ongoing Meltdown or flush reload cache side channel attack as early as possible in a high-performance, precise, and deterministic manner.

The system may include a kernel module driver that interacts with and configures the PMU for relevant counters and provides an interrupt handler. The interrupt handler can be invoked when the PMU counter is triggered, such as by a counter overflow on one of the configured counters. Because Meltdown is a combination of a cache side channel attack (e.g., flush reload) and a covert channel attack (e.g., probe buffer for reading a kernel address), the method disclosed herein may be based on a fingerprint match. The fingerprint match may be determined if there is a flush reload-type cache side channel attack in progress, which can then be correlated to other artifacts to determine if Meltdown is also in progress. This can be accomplished, for example, by checking the stack, registers, and arguments, and looking for a kernel address.

In one example, the kernel driver configures the PMU with the L3_MISS counter, which can be used to track down cache misses. The RTM_ABORTED counter may also be used to track TSX exceptions, which are used in some variations of Meltdown to speed up the attack. Indeed, in some systems, the RTM_ABORTED counter overflow occurs only in the case of a flush reload attack such as a Meltdown attack. The method disclosed herein may be flexible, and may support other counters to take advantage of other features, such as last branch record (LBR), or for tracking down code branches.

When the kernel mode driver receives an interrupt because one of the configured counter overflows, the driver may capture the trap frame, which contains contextual details like the instruction pointer, registers, and other information. The driver may then optionally enqueue the data frame to a deferred procedure call (DPC) for further analysis.

This may be considered a form of sideband analysis, while in other cases, in a more severe context, analysis may be performed in-line, so that an attack can be detected and mitigated while it is in process. In the DPC case, the system may read the trap frame, extract all registers present in the trap frame, and read certain memory regions, which may read certain memory regions around the instruction pointer. These memory regions may be configured by policy.

The system may then disassemble the dump of this memory region with a disassembly engine. The system can thus get assembly sequences and opcodes. After disassembly, the system may correlate whether the code includes flush reload side channel attack-related opcodes such as mfence, lfence, rdtsc, rdtscp, cupid, or similar. The order and combination of these instructions may also be considered in determining whether the code represents a flush reload cache side channel attack.

Furthermore, the system may also check if a flush reload sequence is wrapped within a TSX block by checking for the presence of xbegin and xend. The system may also analyze register values to see if there is any kernel address present. The system is also expandable. For example, the system may check arguments present on the stack to confirm the presence of a kernel address, and determine how it is used in an assembly sequence. Once the system confirms the presence of a kernel address in one of the registers or on the stack, and confirms that it is being used in a flush reload opcode sequence, then it may determine with a high level of confidence that a Meltdown attack is underway.

A system and method for providing remediation of flush reload attacks will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a cache flush reload side channel attack. In this case, a threat 112 may rely on a shared page 108 within memory 104. Threat 112 may be, for example, a Meltdown attack, or some other cache flush reload side channel attack.

As illustrated here, legitimate process 124 and threat 112 both have access to last level cache (LLC) 120. As discussed above, threat 112 may exploit the speed of LLC 120 relative to memory 104 to infer the address of data being used by legitimate process 124.

Figure 2:
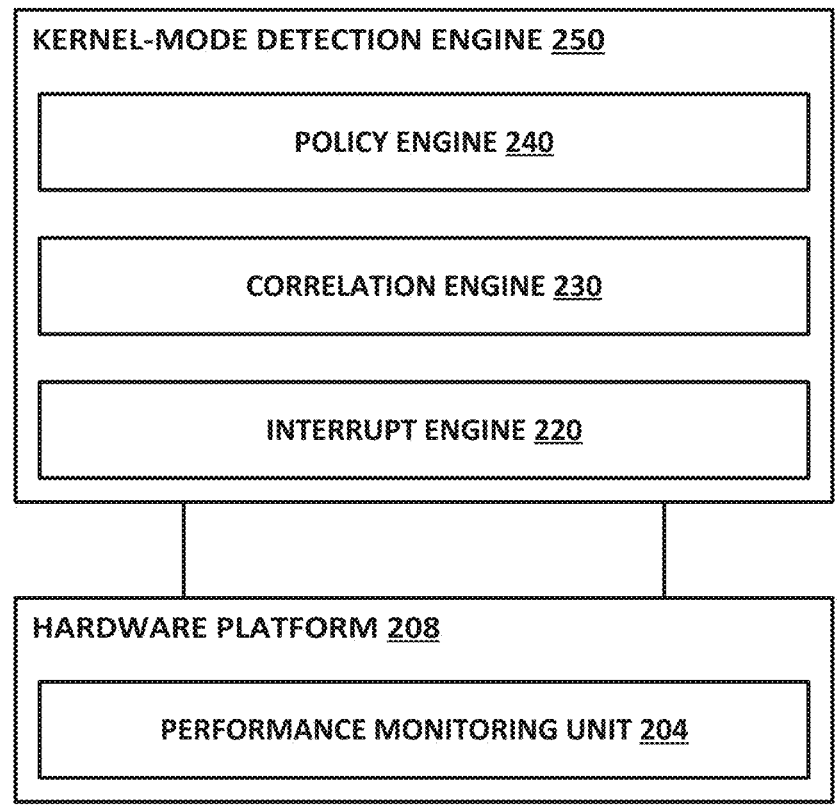
FIG. 2 is a block diagram of a system that may be configured to detect and mitigate Meltdown, or other side-load attacks.

FIG. 2 is a block diagram of a system that may be configured to detect and mitigate Meltdown, or other sideload attacks. In this example, the system includes a hardware platform 208 which provides a performance monitoring unit 204.

Performance monitoring unit 204 may be a hardware circuit, may be implemented in microcode, or may be provided by some other means such as a coprocessor, field-programmable gate array (FPGA), application-specific integrated circuit (ASIC), intellectual property block, or other logic elements. Performance monitoring unit 204 exposes certain counters that are generally intended not for security purposes, but rather for monitoring whether the CPU is performing in an optimal state. For example, a large number of cache misses may indicate that the cache is being poorly utilized. But in the case of a Meltdown or similar attack, an overflow of the cache miss counter may actually be indicative of an attack. This is because a threat, such as threat 112 of FIG. 1, continually attempts to make illegitimate accesses to addresses within a cache such as LLC 120 of FIG. 1, thus causing a large number of cache misses. This continuous illegitimate cache activity can cause the cache miss counter to overflow. Because such a cache miss counter overflow is a relatively uncommon event, it can be used to infer that an attack may be underway. Performance monitoring unit 204 may also provide other counters such as RTM_ABORTED.

In some architectures, particularly in later model processors, RTM_ABORTED may only occur in the case of an attack. Thus, RTM_ABORTED may actually be used to deterministically identify an attack of some kind.

A kernel mode detection engine 250 may be used to register certain PMU events, such as overflows of counters such as the cache miss counter or RTM_ABORTED counter.

When such an interrupt is triggered, it may be captured by an interrupt engine 220 of kernel mode detection engine 250. A correlation engine 230 may then be used to correlate the interrupt and information attached to the interrupt, such as artifacts extractable from a trap frame. If correlation engine 230 determines that the interrupt represents a likely attack, then policy engine 240 may enforce a policy or remediation against the suspect process.

Figure 3:
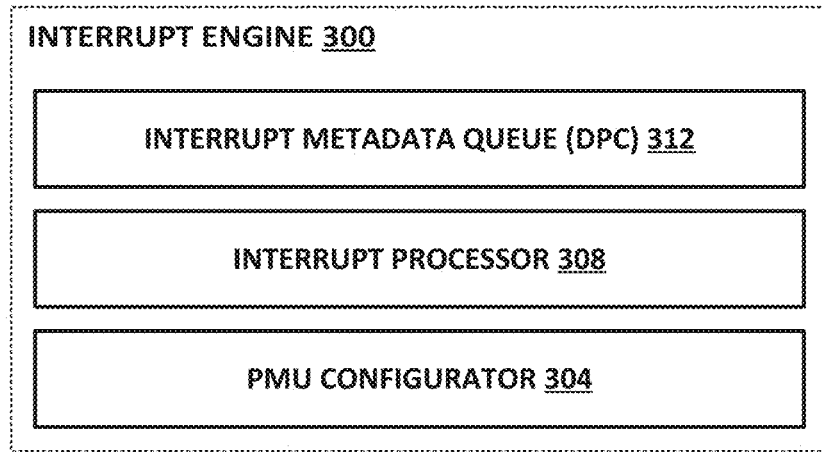
FIG. 3 is a block diagram of an example interrupt engine.

FIG. 3 is a block diagram of an example interrupt engine 300. Interrupt engine 300 may be, for example, a species of an interrupt engine as illustrated by interrupt engine 220 of FIG. 2.

In this example, interrupt engine 300 includes a PMU configurator 304, an interrupt processor 308, and an interrupt metadata queue 312.

PMU configurator 304 may be provided to register certain events with the PMU, so that those events can be analyzed in connection with detection and mitigation of an attack.

Interrupt processor 308 may include the actual interrupt handler code that is run when an interrupt occurs in response to a PMU event. Optionally, interrupt processor 308 may enqueue the data via interrupt metadata queue 312. In that case, the enqueued data may be provided to a DPC. Alternately, the interrupt handler of interrupt processor 308 may halt the suspect process, and perform analysis in-line before allowing the process to continue. The decision of whether to halt the process and perform analysis and remediation in-line, or to perform an out-of-band analysis in the DPC, may be determined by policy. The policy may be based on the potential severity of the attack, and other factors such as the sensitivity of the data that may be compromised, or user preferences.

Figure 4:
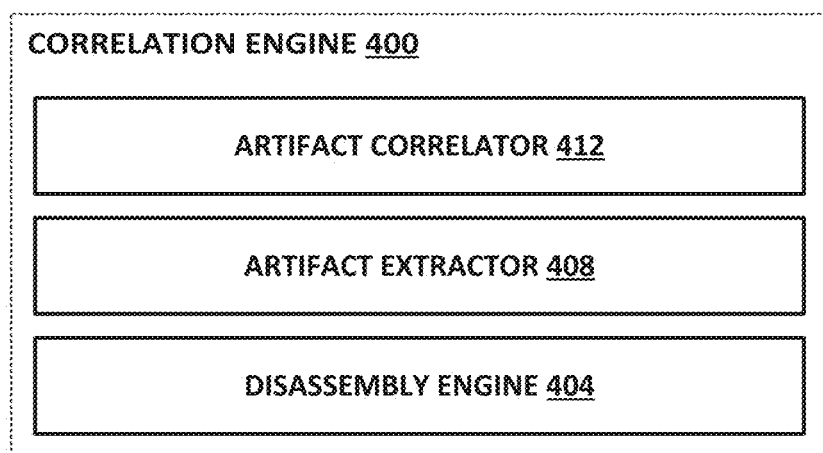
FIG. 4 is a block diagram of a correlation engine.

FIG. 4 is a block diagram of a correlation engine 400. Correlation engine 400 may be a species or example of correlation engine 230 of FIG. 2.

Correlation engine 400 includes a disassembly engine 404, an artifact extractor 408, and an artifact correlator 412.

When an interrupt is triggered, the interrupt handler may receive a trap frame which includes contextual details such as the instruction pointer and registers. Either in-line or in a DPC, disassembly engine 404 may disassemble the trap frame, including instructions before and/or after the instruction pointer, to gain a greater contextual view of the process being executed.

Artifact extractor 408 performs this extraction by traversing both forward and backward in the instruction queue to extract structures, registers, and other artifacts.

Artifact correlator 412 may then analyze the extracted artifacts to determine whether they represent a likely attack. For example, artifact correlator 412 may look for instructions that are commonly used in flush reload side channel-type attacks, such as mfence, lfence, rdtsc, rdtscp, cupid, and other similar instructions. Artifact correlator 412 may look not only for the presence of these instructions, but also whether the instructions are present in a particular order or combination that is consistent with a flush reload side channel attack.

Figure 5:
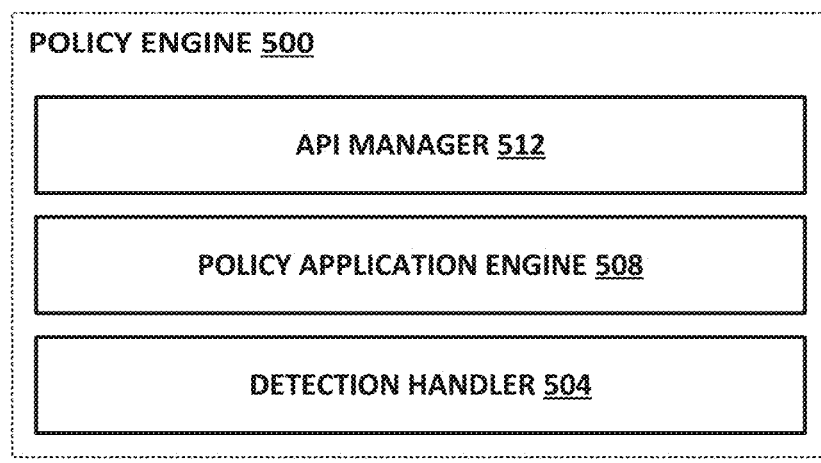
FIG. 5 is a block diagram of a policy engine.

FIG. 5 is a block diagram of a policy engine 500. Policy engine 500 may be an example or a species of policy engine 240 of FIG. 2.

In this example, policy engine 500 includes detection handler 504, policy application engine 508, and API manager 512. Detection handler 504 may include policies or directives for which actions to take when a probable threat is detected. This could include, for example, notifying a security administrator or security services provider, triggering sandboxing or other protection of a suspected process, terminating the process, notifying a user, triggering deep packet inspection or other deep analysis, or other security policy. Once detection handler 504 determines an appropriate policy, it provides the policy to policy application engine 508. Policy application engine 508 may then apply the selected policy to the system to effect the policy specified by detection handler 504.

In some cases, policy application engine 508 may rely on an API manager 512 to provide access to resources or APIs that can be used to effect the desired policy.

Figure 6:
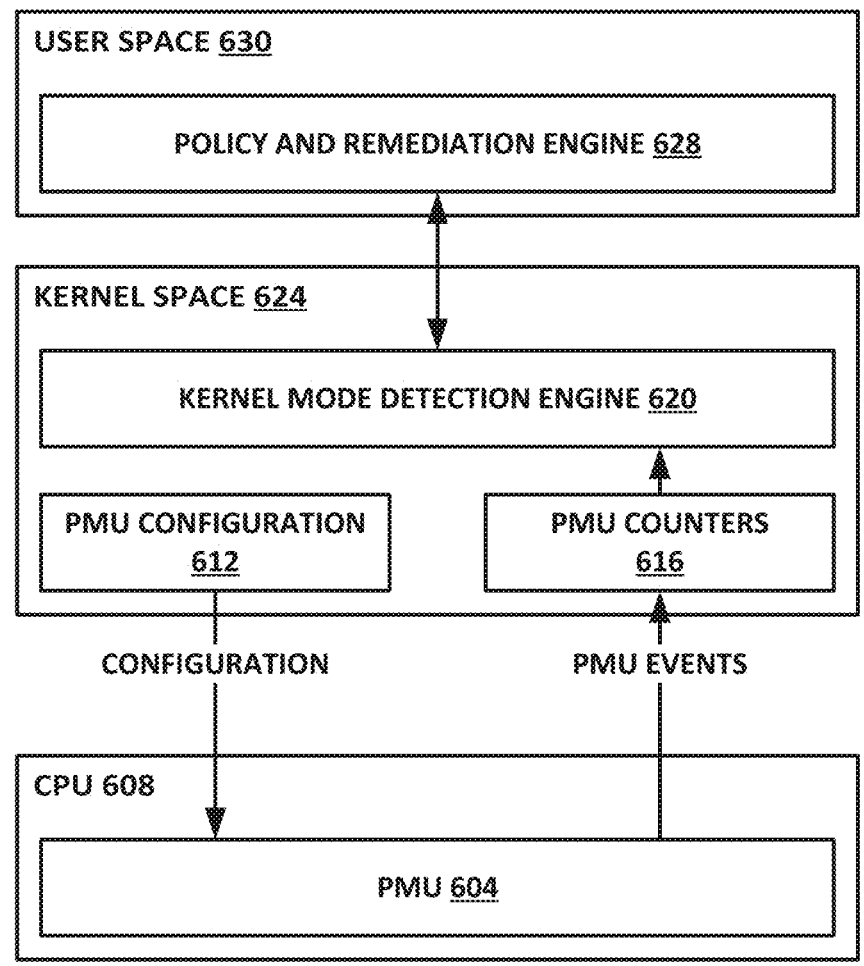
FIG. 6 is a block diagram of a system.

FIG. 6 is a block diagram of a system. In this example, PMU 604 is embodied specifically within a CPU 608. This example also illustrates a kernel space 624 and a user space 630.

This embodiment illustrates that certain aspects of the present specification may span both the kernel space 624 and user space 630. For example, PMU configuration 612 may be analogous to, or may be a species of, PMU configurator 304. In this example, PMU configuration 612 resides in kernel space 624 and provides configuration directives to PMU 604.

PMU 604 provides registered PMU events to PMU counters 616 within kernel space 604. PMU counters 616 may be species, examples, or variations on interrupt processor 308 of FIG. 3.

Kernel mode detection engine 620 also resides within kernel space 624, and may include elements of interrupt engine 300 of FIG. 3 and/or correlation engine 400 of FIG. 4.

In this example, a policy and remediation engine 628 is provided within user space 630. Policy and remediation engine 628 may be a species, example, or variation of policy engine 500. This illustrates that not all elements of the present system need reside within kernel space 624. Rather, in some cases, policy may be carried out and enforced in user space 630.

The selection of which elements to place in kernel space 624 and which elements to place in user space 630 is a design consideration that may be driven by the particular environment of a specific embodiment.

Figure 7:
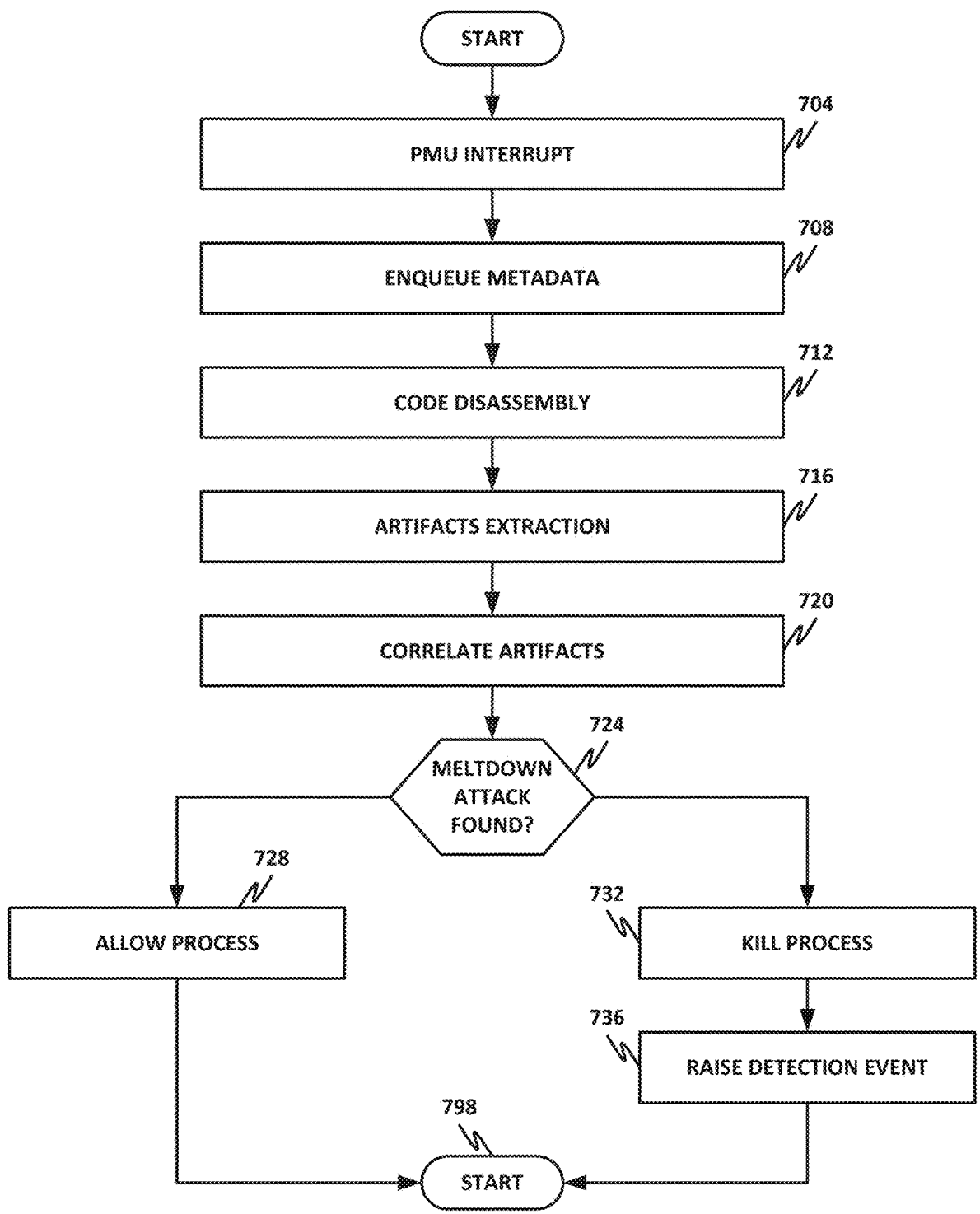
FIG. 7 is a flowchart of a method.

FIG. 7 is a flowchart of a method 700. In method 700, at block 704, the system receives a PMU interrupt, such as a cache miss counter overflow, or an RTM_ABORTED counter overflow, by way of nonlimiting example.

In block 708, the system may optionally enqueue the metadata, for example, if a DPC is being used for interrupt handling.

In block 712, the system performs code disassembly, such as by looking ahead of and behind the current instruction pointer to identify a code snapshot that is representative of the current process.

In block 716, the system extracts artifacts of interest so that they can be further examined.

In block 720, the system attempts to correlate artifacts in a way that is representative of a cache flush reload side channel attack, a Meltdown attack, or some other similar attack.

In decision block 724, the system determines whether a Meltdown attack, or some other cache flush reload side channel attack or similar attack is underway.

If no attack is found to be underway, then in block 728, the system may simply allow the process to complete, and in block 798, the method is done.

Returning to decision block 724, if an attack such as a Meltdown attack or a cache flush reload side channel attack is detected, then remedial action may be taken. For example, in block 732, according to a system policy, the offending process may be terminated or killed.

In block 736, a detection event may be raised, such as to a user, a central authority, an antivirus services provider, a security administrator, or to some other entity. Note that blocks 732 and 736 represent only two example remedial actions that may be taken from among an entire universe of potential remedial actions that can be taken in response to a detected attack.

In block 798, the method is done.

Figure 8:
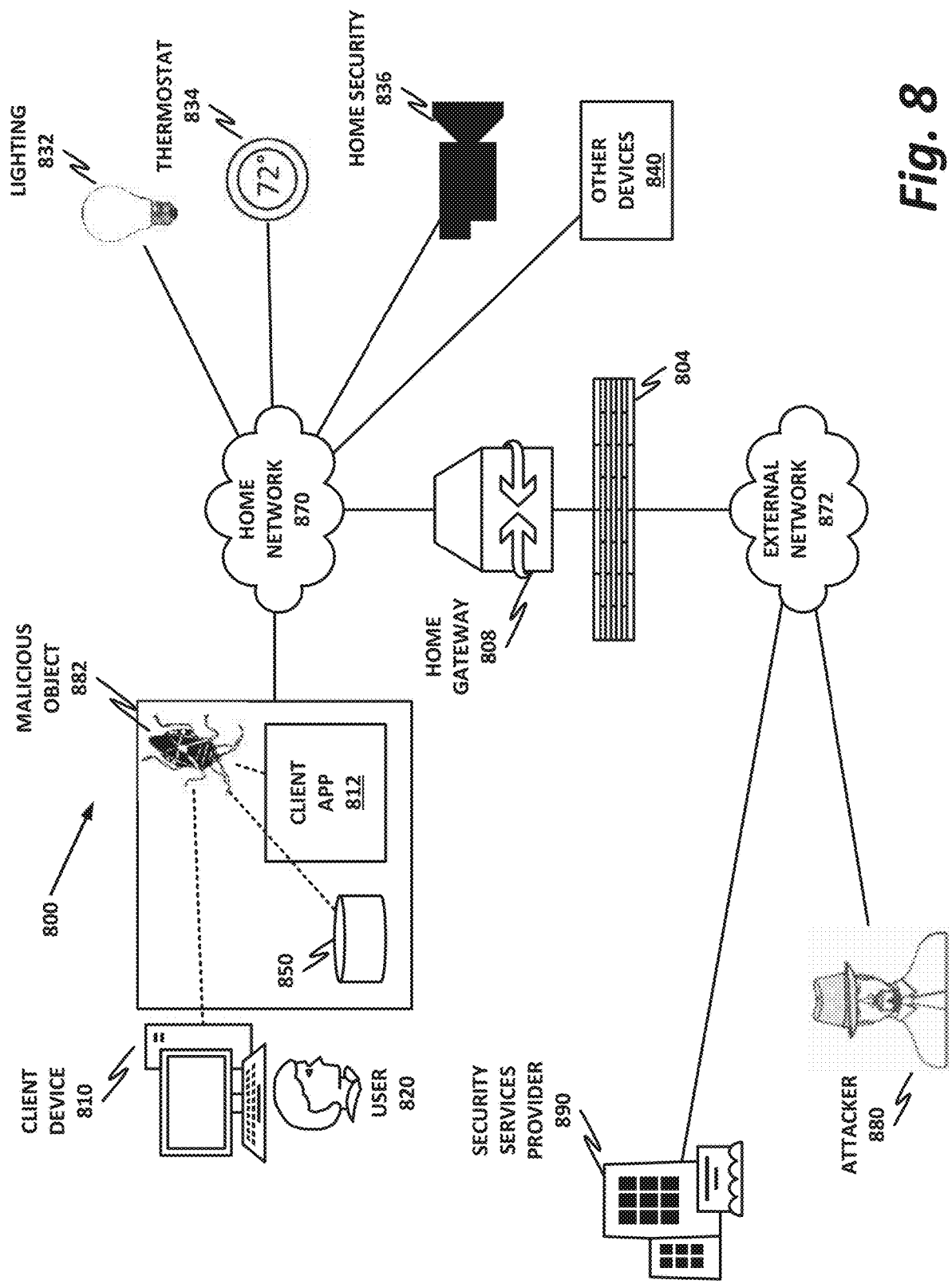
FIG. 8 is a block diagram of a home network.

FIG. 8 is a block diagram of a home network 800. In the example of FIG. 8, home network 800 may be a "smart home" with various Internet of things (IoT) devices that provide home automation or other services. Home network 800 is provided herein as an illustrative and nonlimiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 800, one or more users 820 operate one or more client devices 810. A single user 820 and single client device 810 are illustrated here for simplicity, but a home or enterprise may have multiple users, each of which may have multiple devices.

Client devices 810 may be communicatively coupled to one another and to other network resources via home network 870. Home network 870 may be any suitable network or combination of one or more networks operating on one or more suitable networking protocols, including a local area network, an intranet, a virtual network, a wide area network, a wireless network, a cellular network, or the Internet (optionally accessed via a proxy, virtual machine, or other similar security mechanism) by way of nonlimiting example. Home network 870 may also include one or more servers, firewalls, routers, switches, security appliances, antivirus servers, or other network devices, which may be single-purpose appliances, virtual machines, containers, or functions running on client devices 810.

In this illustration, home network 870 is shown as a single network for simplicity, but in some embodiments, home network 870 may include any number of networks, such as one or more intranets connected to the Internet. Home network 870 may also provide access to an external network, such as the Internet, via external network 872. External network 872 may similarly be any suitable type of network.

Home network 870 may connect to the Internet via a home gateway 808, which may be responsible, among other things, for providing a logical boundary between home network 872 and external network 870. Home network 870 may also provide services such as dynamic host configuration protocol (DHCP), gateway services, router services, and switching services, and may act as a security portal across home boundary 804.

Home network 800 may also include a number of discrete IoT devices, which in contemporary practice are increasing regularly. For example, home network 800 may include IoT functionality to control lighting 832, thermostats or other environmental controls 834, a home security system 836, and any number of other devices 840. Other devices 840 may include, as illustrative and nonlimiting examples, network attached storage (NAS), computers, printers, smart televisions, smart refrigerators, smart vacuum cleaners and other appliances, and network connected vehicles.

Home network 800 may communicate across home boundary 804 with external network 872. Home boundary 804 may represent a physical, logical, or other boundary. External network 872 may include, for example, websites, servers, network protocols, and other network-based services. In one example, an attacker 880 (or other similar malicious or negligent actor) also connects to external network 872. A security services provider 890 may provide services to home network 800, such as security software, security updates, network appliances, or similar. For example, McAfee, Inc. provides a comprehensive suite of security services that may be used to protect home network 800.

It may be a goal of users 820 and home network 800 to successfully operate client devices 810 and IoT devices without interference from attacker 880 or from unwanted security objects. In one example, attacker 880 is a malware author whose goal or purpose is to cause malicious harm or mischief, for example, by injecting malicious object 882 into client device 810. According to embodiments of the present specification, malicious object 882 may include a Meltdown-style attack, a fileless attack, or a living off the land attack. Meltdown-style, fileless, or living off the land attacks may be considered security threats or attacks, by way of nonlimiting example.

Once malicious object 882 gains access to client device 810, it may try to perform work such as social engineering of user 820, a hardware-based attack on client device 810, modifying storage 850 (or volatile memory), modifying client application 812 (which may be running in memory), or gaining access to home resources. Furthermore, attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 880 to leverage against home network 870.

Malicious harm or mischief may take the form of installing root kits or other malware on client devices 810 to tamper with the system, installing spyware or adware to collect personal and commercial data, defacing websites, operating a botnet such as a spam server, or simply to annoy and harass users 820. Thus, one aim of attacker 880 may be to install his malware on one or more client devices 810 or any of the IoT devices described. As used throughout this specification, malicious software ("malware") includes any security object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 880 may also want to commit industrial or other espionage, such as stealing classified or proprietary data, stealing identities, or gaining unauthorized access to enterprise resources. Thus, attacker 880's strategy may also include trying to gain physical access to one or more client devices 810 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 880. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 800 may contract with or subscribe to a security services provider 890, which may provide security services, updates, antivirus definitions, patches, products, and services. McAfee®, Inc. is a nonlimiting example of such a security services provider that offers comprehensive security and antivirus solutions. In some cases, security services provider 890 may include a threat intelligence capability such as the global threat intelligence (GTI™) database provided by McAfee Inc. Security services provider 890 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

Figure 9:
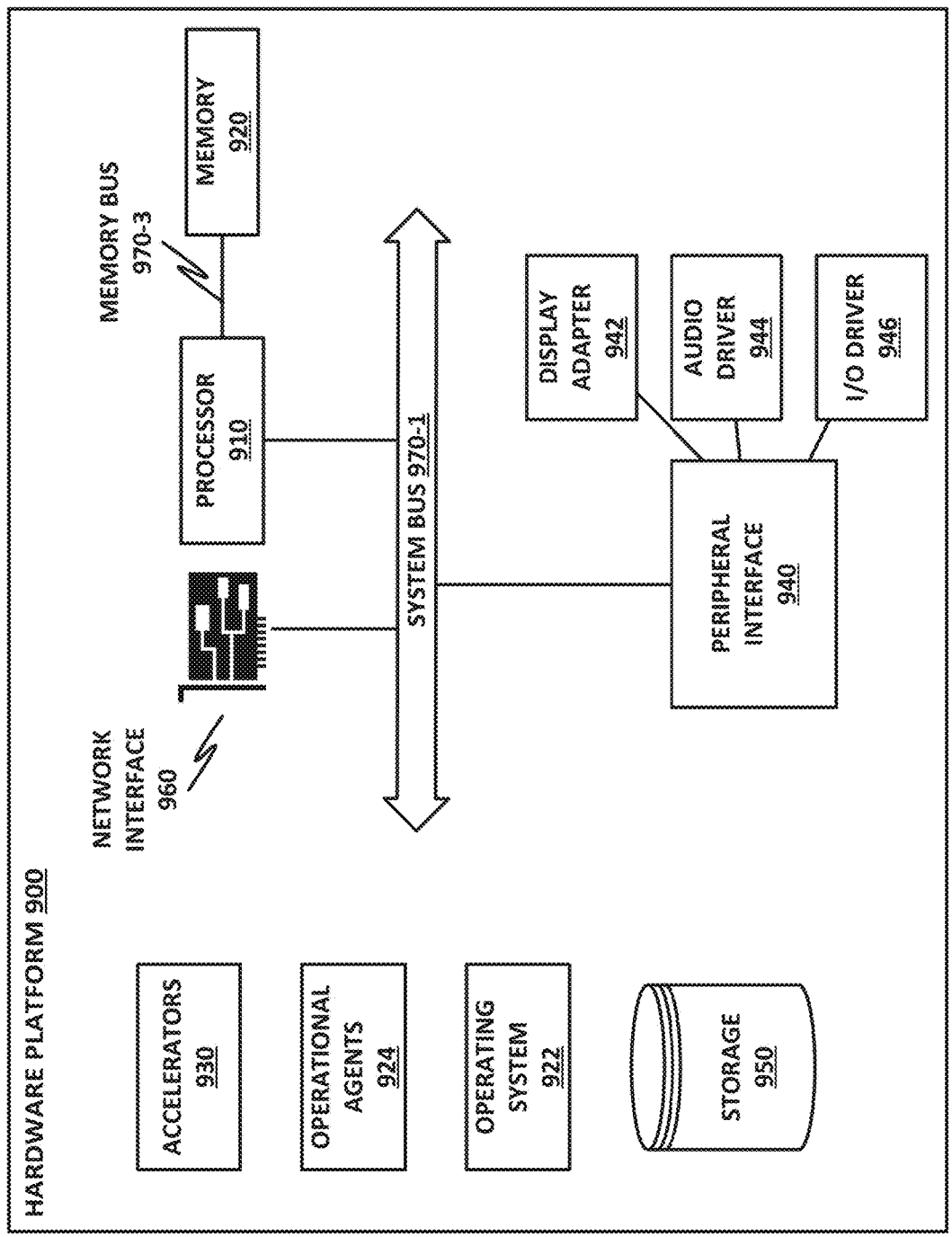
FIG. 9 is a block diagram of a hardware platform.

FIG. 9 is a block diagram of hardware platform 900. Hardware platform 900 may represent any suitable computing device. In various embodiments, a "computing device" may be or comprise, by way of nonlimiting example, a computer, workstation, server, mainframe, virtual machine (whether emulated or on a "bare-metal" hypervisor), network appliance, container, IoT device, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it, including any device hosted on the same hardware but that is logically separated (e.g., a different virtual machine, container, or guest) may be designated as a "remote host."

In certain embodiments, client devices 810, home gateway 808, and the IoT devices illustrated in FIG. 8 may all be examples of devices that run on a hardware platform such as hardware platform 900. FIG. 9 presents a view of many possible elements that may be included in a hardware platform, but it should be understood that not all of these are necessary in every platform, and platforms may also include other elements. For example, peripheral interface 940 may be an essential component in a user-class device to provide input and output, while it may be completely unnecessary in a virtualized server or hardware appliance that communicates strictly via networking protocols.

By way of illustrative example, hardware platform 900 provides a processor 910 connected to a memory 920 and other system resources via one or more buses, such a system bus 970-1 and a memory bus 970-3.

Other components of hardware platform 900 include a storage 950, network interface 960, and peripheral interface 940. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 920 and storage 950, for example, in a single physical memory device, and in other cases, memory 920 and/or storage 950 are functionally distributed across many physical devices. In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 960 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In various examples, a "processor" may include any combination of logic elements operable to execute instructions, whether loaded from memory, or implemented directly in hardware, including, by way of nonlimiting example, a microprocessor, digital signal processor, FPGA, graphics processing unit, programmable logic array, application-specific integrated circuit, or virtual machine processor. In certain architectures, a multi-core processor may be provided, in which case processor 910 may be treated as only one core of a multi-core processor, or may be treated as the entire multi-core processor, as appropriate. In some embodiments, one or more co-processors may also be provided for specialized or support functions.

Processor 910 may be communicatively coupled to devices via a system bus 970-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 970-1 is not so limited, and may include any other type of bus. Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 910 is communicatively coupled to memory 920 via memory bus 970-3, which may be, for example, a direct memory access (DMA) bus, though other memory architectures are possible, including ones in which memory 920 communicates with processor 910 via system bus 970-1 or some other bus. In the same or an alternate embodiment, memory bus 970-3 may include remote direct memory access (RDMA), wherein processor 910 accesses disaggregated memory resources via DMA or DMA-like interfaces.

To simplify this disclosure, memory 920 is disclosed as a single logical block, but in a physical embodiment may include one or more blocks of any suitable volatile or nonvolatile memory technology or technologies, including, for example, double data rate random access memory (DDR RAM), static random access memory (SRAM), dynamic random access memory (DRAM), persistent random access memory (PRAM), or other similar persistent fast memory, cache, Layer 1 (L1) or Layer 2 (L2) memory, on-chip memory, registers, flash, read-only memory (ROM), optical media, virtual memory regions, magnetic or tape memory, or similar. In certain embodiments, memory 920 may comprise a relatively low-latency volatile main memory, while storage 950 may comprise a relatively higher-latency nonvolatile memory. However, memory 920 and storage 950 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 950 may be any species of memory 920, or may be a separate device. Storage 950 may include one or more non-transitory computer-readable mediums, including, by way of nonlimiting example, a hard drive, solid-state drive, external storage, microcode, hardware instructions, redundant array of independent disks (RAID), NAS, optical storage, tape drive, backup system, cloud storage, or any combination of the foregoing. Storage 950 may be, or may include therein, a database or databases or data stored in other configurations, and may include a stored copy of operational software such as operating system 922 and software portions, if any, of operational agents 924, accelerators 930, or other engines. Many other configurations are also possible, and are intended to be encompassed within the broad scope of this specification.

As necessary, hardware platform 900 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 900 may be configured for virtualization or containerization, in which case it may also provide a hypervisor, virtualization platform, virtual machine manager (VMM), orchestrator, containerization platform, or other infrastructure to provide flexibility in allocating resources.

Network interface 960 may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Operational agents 924 are one or more computing engines that may include one or more non-transitory computer-readable mediums having stored thereon executable instructions operable to instruct a processor to provide operational functions. Operational agents 924 may include, by way of nonlimiting example, an interrupt engine, a correlation engine, a policy engine, and/or a policy application engine, as provided in embodiments of the present disclosure.

At an appropriate time, such as upon booting hardware platform 900 or upon a command from operating system 922 or a user or security administrator, processor 910 may retrieve a copy of operational agents 924 (or software portions thereof) from storage 950 and load it into memory 920. Processor 910 may then iteratively execute the instructions of operational agents 924 to provide the desired methods or functions.

As used throughout this specification, an "engine" includes any combination of one or more logic elements, of similar or dissimilar species, operable for and configured to perform one or more methods provided by the engine. In some cases, the engine may include a special integrated circuit designed to carry out a method or a part thereof, an FPGA programmed to provide a function, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware and software, including configuration files, registry entries, application programming interfaces (APIs), and interactive or user-mode software by way of nonlimiting example.

Peripheral interface 940 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 942, audio driver 944, and input/output (I/O) driver 946. Display adapter 942 may be configured to provide a human-readable visual output, such as a command-line interface (CLI) or graphical desktop such as Microsoft Windows, Apple OSX desktop, or a Unix/Linux X Window System-based desktop. Display adapter 942 may provide output in any suitable format, such as a coaxial output, composite video, component video, video graphics array (VGA), or digital outputs such as digital visual interface (DVI) or high definition multimedia interface (HDMI), by way of nonlimiting example. In some examples, display adapter 942 may include a hardware graphics card, which may have its own memory and its own graphics processing unit (GPU). Audio driver 944 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

Figure 10:
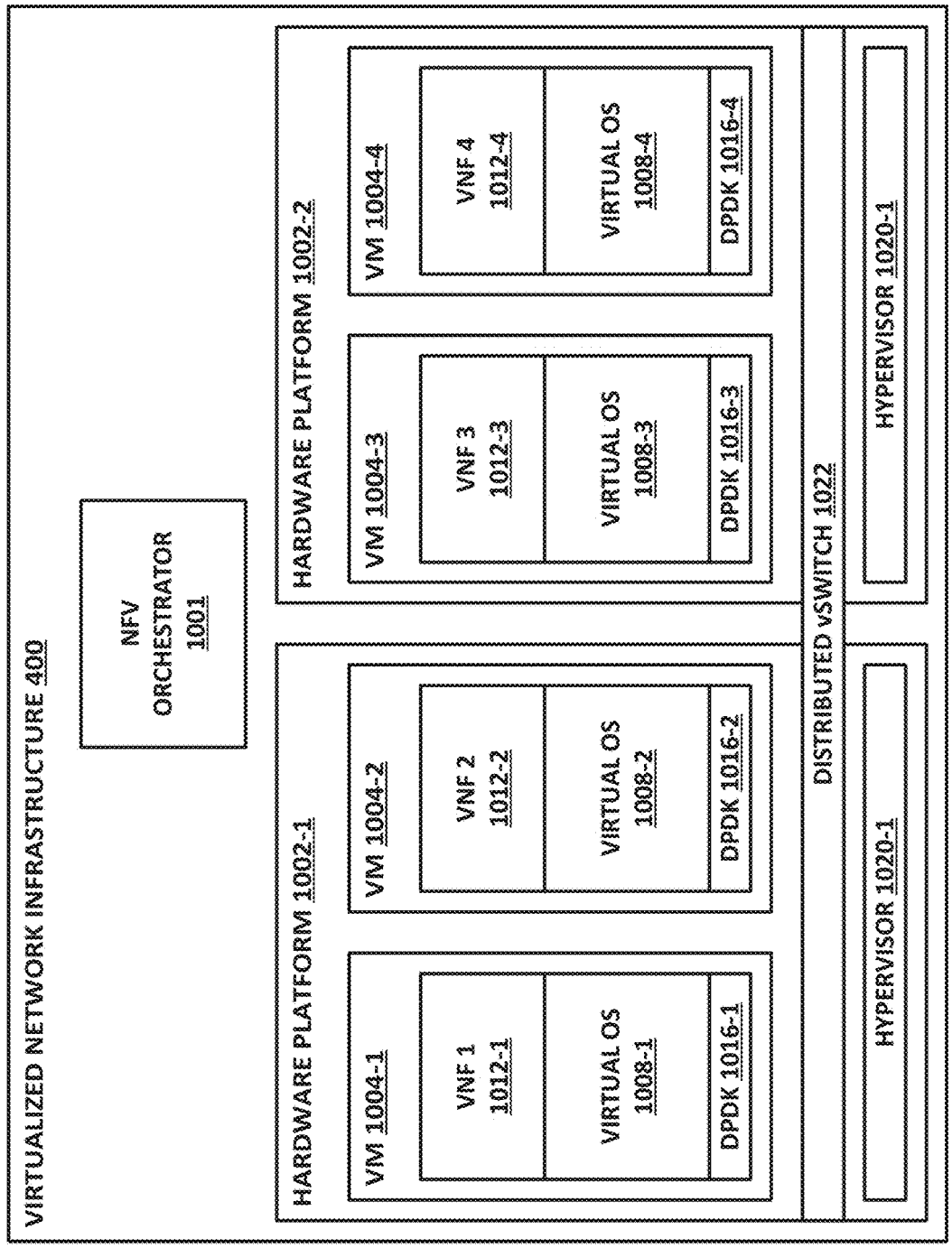
FIG. 10 is a block diagram of a network function virtualization (NFV) infrastructure.

FIG. 10 is a block diagram of a network function virtualization (NFV) infrastructure 1000. In embodiments of the present disclosure, a Meltdown-style attack can break the isolation between tenants of a cloud data center in a virtualization environment.

NFV is an aspect of network virtualization that is generally considered distinct from, but that can still interoperate with, a software defined network. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are in-line service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 10, an NFV orchestrator 1001 manages a number of the VNFs 1012 running on an NFVI 1000. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1001 a valuable system resource. Note that NFV orchestrator 1001 may provide a browser-based or graphical configuration interface, and in some embodiments may be integrated with SDN orchestration functions.

Note that NFV orchestrator 1001 itself may be virtualized (rather than a special-purpose hardware appliance). NFV orchestrator 1001 may be integrated within an existing SDN system, wherein an operations support system (OSS) manages the SDN. This may interact with cloud resource management systems (e.g., OpenStack) to provide NFV orchestration. An NFVI 1000 may include the hardware, software, and other infrastructure to enable VNFs to run. This may include a hardware platform 1002 on which one or more VMs 1004 may run. For example, hardware platform 1002-1 in this example runs VMs 1004-1 and 1004-2. Hardware platform 1002-2 runs VMs 1004-3 and 1004-4. Each hardware platform may include a hypervisor 1020, VMM, or similar function, which may include and run on a native (bare-metal) operating system, which may be minimal so as to consume very few resources.

Hardware platforms 1002 may be or comprise a rack or several racks of blade or slot servers (including, e.g., processors, memory, and storage), one or more data centers, other hardware resources distributed across one or more geographic locations, hardware switches, or network interfaces. An NFVI 1000 may also include the software architecture that enables hypervisors to run and be managed by NFV orchestrator 1001.

Running on NFVI 1000 are a number of VMs 1004, each of which in this example is a VNF providing a virtual service appliance. Each VM 1004 in this example includes an instance of the Data Plane Development Kit (DPDK), a virtual operating system 1008, and an application providing the VNF 1012.

Virtualized network functions could include, as nonlimiting and illustrative examples, firewalls, intrusion detection systems, load balancers, routers, session border controllers, DPI services, network address translation (NAT) modules, or call security association.

The illustration of FIG. 10 shows that a number of VNFs 1004 have been provisioned and exist within NFVI 1000. This FIGURE does not necessarily illustrate any relationship between the VNFs and the larger network, or the packet flows that NFVI 1000 may employ.

The illustrated DPDK instances 1016 provide a set of highly-optimized libraries for communicating across a virtual switch (vSwitch) 1022. Like VMs 1004, vSwitch 1022 is provisioned and allocated by a hypervisor 1020. The hypervisor uses a network interface, such as a host fabric interface (HFI) by way of nonlimiting example, to connect the hardware platform to the data center. This HFI may be shared by all VMs 1004 running on a hardware platform 1002. Thus, a vSwitch may be allocated to switch traffic between VMs 1004. The vSwitch may be a pure software vSwitch (e.g., a shared memory vSwitch), which may be optimized so that data are not moved between memory locations, but rather, the data may stay in one place, and pointers may be passed between VMs 1004 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1022 is illustrated, wherein vSwitch 1022 is shared between two or more physical hardware platforms 1002.

Figure 11:
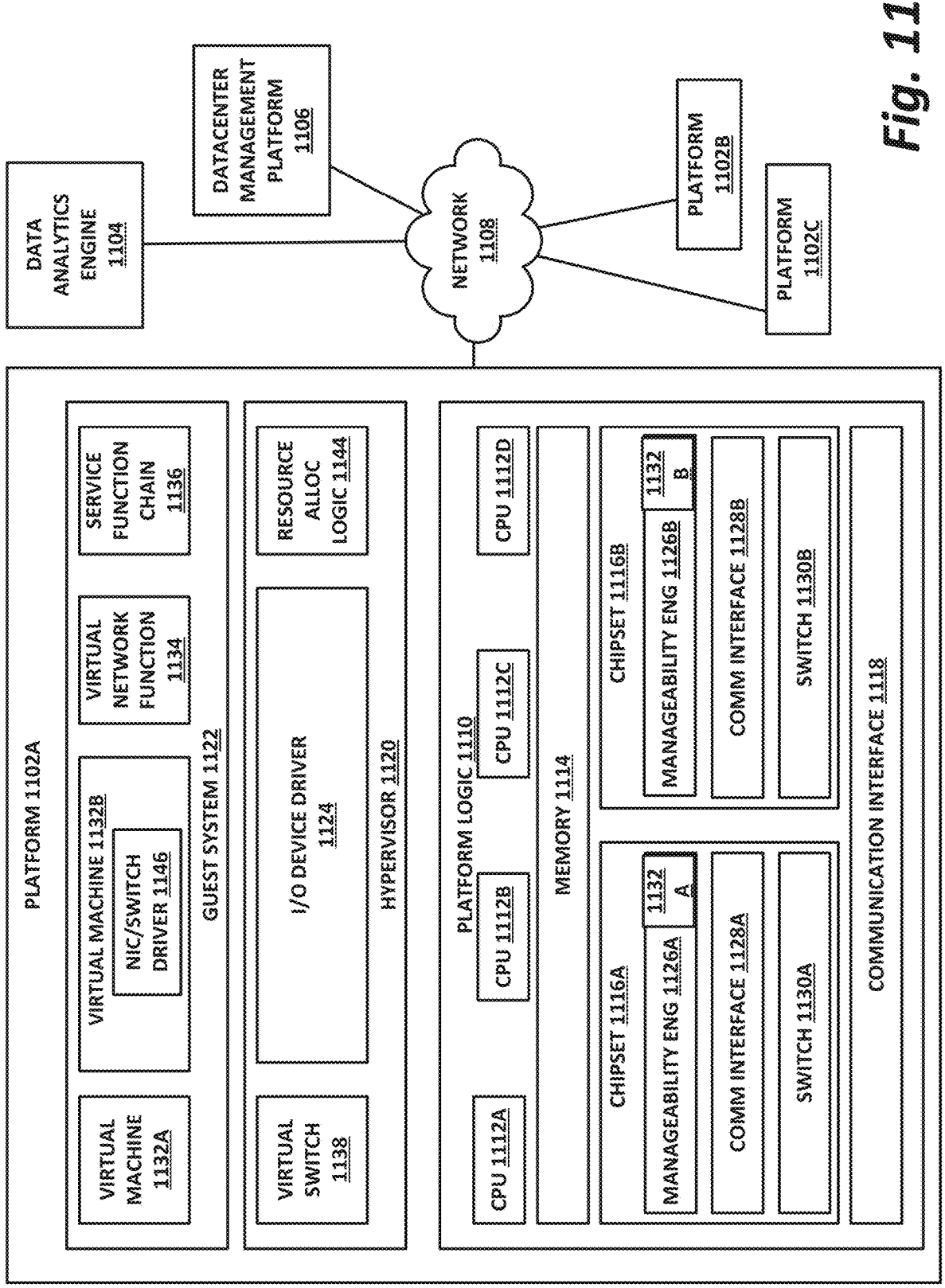
FIG. 11 is a block diagram of components of a computing platform.

FIG. 11 is a block diagram of components of a computing platform 1102A. Embodiments of computing platform 1102A disclosed herein may be adapted or configured to provide the method of remediation of flush reload attacks, according to the teachings of the present specification.

In the embodiment depicted, platforms 1102A, 1102B, and 1102C, along with a data center management platform 1106 and data analytics engine 1104 are interconnected via network 1108. In other embodiments, a computer system may include any suitable number (i.e., one or more) of platforms. In some embodiments (e.g., when a computer system only includes a single platform), all or a portion of the system management platform 1106 may be included on a platform 1102. A platform 1102 may include platform logic 1110 with one or more CPUs 1112, memories 1114 (which may include any number of different modules), chipsets 1116, communication interfaces 1118, and any other suitable hardware and/or software to execute a hypervisor 1120 or other operating system capable of executing workloads associated with applications running on platform 1102. In some embodiments, a platform 1102 may function as a host platform for one or more guest systems 1122 that invoke these applications. Platform 1102A may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 1106, hypervisor 1120, or other operating system) of computer platform 1102A may assign hardware resources of platform logic 1110 to perform workloads in accordance with the stress information. In some embodiments, self-diagnostic capabilities may be combined with the stress monitoring to more accurately determine the health of the hardware resources. Each platform 1102 may include platform logic 1110. Platform logic 1110 comprises, among other logic enabling the functionality of platform 1102, one or more CPUs 1112, memory 1114, one or more chipsets 1116, and communication interfaces 1128. Although three platforms are illustrated, computer platform 1102A may be interconnected with any suitable number of platforms. In various embodiments, a platform 1102 may reside on a circuit board that is installed in a chassis, rack, or other suitable structure that comprises multiple platforms coupled together through network 1108 (which may comprise, e.g., a rack or backplane switch).

CPUs 1112 may each comprise any suitable number of processor cores and supporting logic (e.g., uncores). The cores may be coupled to each other, to memory 1114, to at least one chipset 1116, and/or to a communication interface 1118, through one or more controllers residing on CPU 1112 and/or chipset 1116. In particular embodiments, a CPU 1112 is embodied within a socket that is permanently or removably coupled to platform 1102A. Although four CPUs are shown, a platform 1102 may include any suitable number of CPUs.

Memory 1114 may comprise any form of volatile or nonvolatile memory including, without limitation, magnetic media (e.g., one or more tape drives), optical media, RAM, ROM, flash memory, removable media, or any other suitable local or remote memory component or components. Memory 1114 may be used for short, medium, and/or long term storage by platform 1102A. Memory 1114 may store any suitable data or information utilized by platform logic 1110, including software embedded in a computer-readable medium, and/or encoded logic incorporated in hardware or otherwise stored (e.g., firmware). Memory 1114 may store data that is used by cores of CPUs 1112. In some embodiments, memory 1114 may also comprise storage for instructions that may be executed by the cores of CPUs 1112 or other processing elements (e.g., logic resident on chipsets 1116) to provide functionality associated with the manageability engine 1126 or other components of platform logic 1110. A platform 1102 may also include one or more chipsets 1116 comprising any suitable logic to support the operation of the CPUs 1112. In various embodiments, chipset 1116 may reside on the same die or package as a CPU 1112 or on one or more different dies or packages. Each chipset may support any suitable number of CPUs 1112. A chipset 1116 may also include one or more controllers to couple other components of platform logic 1110 (e.g., communication interface 1118 or memory 1114) to one or more CPUs. In the embodiment depicted, each chipset 1116 also includes a manageability engine 1126. Manageability engine 1126 may include any suitable logic to support the operation of chipset 1116. In a particular embodiment, a manageability engine 1126 (which may also be referred to as an innovation engine) is capable of collecting real-time telemetry data from the chipset 1116, the CPU(s) 1112 and/or memory 1114 managed by the chipset 1116, other components of platform logic 1110, and/or various connections between components of platform logic 1110. In various embodiments, the telemetry data collected includes the stress information described herein.

In various embodiments, a manageability engine 1126 operates as an out-of-band asynchronous compute agent which is capable of interfacing with the various elements of platform logic 1110 to collect telemetry data with no or minimal disruption to running processes on CPUs 1112. For example, manageability engine 1126 may comprise a dedicated processing element (e.g., a processor, controller, or other logic) on chipset 1116, which provides the functionality of manageability engine 1126 (e.g., by executing software instructions), thus conserving processing cycles of CPUs 1112 for operations associated with the workloads performed by the platform logic 1110. Moreover, the dedicated logic for the manageability engine 1126 may operate asynchronously with respect to the CPUs 1112 and may gather at least some of the telemetry data without increasing the load on the CPUs.

A manageability engine 1126 may process telemetry data it collects (specific examples of the processing of stress information will be provided herein). In various embodiments, manageability engine 1126 reports the data it collects and/or the results of its processing to other elements in the computer system, such as one or more hypervisors 1120 or other operating systems and/or system management software (which may run on any suitable logic such as system management platform 1106). In particular embodiments, a critical event such as a core that has accumulated an excessive amount of stress may be reported prior to the normal interval for reporting telemetry data (e.g., a notification may be sent immediately upon detection).

Additionally, manageability engine 1126 may include programmable code configurable to set which CPU(s) 1112 a particular chipset 1116 will manage and/or which telemetry data will be collected.

Chipsets 1116 also each include a communication interface 1128. Communication interface 1128 may be used for the communication of signaling and/or data between chipset 1116 and one or more I/O devices, one or more networks 1108, and/or one or more devices coupled to network 1108 (e.g., system management platform 1106). For example, communication interface 1128 may be used to send and receive network traffic such as data packets. In a particular embodiment, a communication interface 1128 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 1116 (e.g., manageability engine 1126 or switch 1130) and another device coupled to network 1108. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 1128 may allow communication of data (e.g., between the manageability engine 1126 and the data center management platform 1106) associated with management and monitoring functions performed by manageability engine 1126. In various embodiments, manageability engine 1126 may utilize elements (e.g., one or more NICs) of communication interfaces 1128 to report the telemetry data (e.g., to system management platform 1106) in order to reserve usage of NICs of communication interface 1118 for operations associated with workloads performed by platform logic 1110.

Switches 1130 may couple to various ports (e.g., provided by NICs) of communication interface 1128 and may switch data between these ports and various components of chipset 1116 (e.g., one or more Peripheral Component Interconnect Express (PCIe) lanes coupled to CPUs 1112). Switches 1130 may be a physical or virtual (i.e., software) switch.

Platform logic 1110 may include an additional communication interface 1118. Similar to communication interfaces 1128, communication interfaces 1118 may be used for the communication of signaling and/or data between platform logic 1110 and one or more networks 1108 and one or more devices coupled to the network 1108. For example, communication interface 1118 may be used to send and receive network traffic such as data packets. In a particular embodiment, communication interfaces 1118 comprise one or more physical NICs. These NICs may enable communication between any suitable element of platform logic 1110 (e.g., CPUs 1112 or memory 1114) and another device coupled to network 1108 (e.g., elements of other platforms or remote computing devices coupled to network 1108 through one or more networks).

Platform logic 1110 may receive and perform any suitable types of workloads. A workload may include any request to utilize one or more resources of platform logic 1110, such as one or more cores or associated logic. For example, a workload may comprise a request to instantiate a software component, such as an I/O device driver 1124 or guest system 1122; a request to process a network packet received from a virtual machine 1132 or device external to platform 1102A (such as a network node coupled to network 1108); a request to execute a process or thread associated with a guest system 1122, an application running on platform 1102A, a hypervisor 1120 or other operating system running on platform 1102A; or other suitable processing request.

A virtual machine 1132 may emulate a computer system with its own dedicated hardware. A virtual machine 1132 may run a guest operating system on top of the hypervisor 1120. The components of platform logic 1110 (e.g., CPUs 1112, memory 1114, chipset 1116, and communication interface 1118) may be virtualized such that it appears to the guest operating system that the virtual machine 1132 has its own dedicated components.

A virtual machine 1132 may include a virtualized NIC (vNIC), which is used by the virtual machine as its network interface. A vNIC may be assigned a media access control (MAC) address or other identifier, thus allowing multiple virtual machines 1132 to be individually addressable in a network.

VNF 1134 may comprise a software implementation of a functional building block with defined interfaces and behavior that can be deployed in a virtualized infrastructure. In particular embodiments, a VNF 1134 may include one or more virtual machines 1132 that collectively provide specific functionalities (e.g., WAN optimization, VPN termination, firewall operations, load balancing operations, security functions, etc.). A VNF 1134 running on platform logic 1110 may provide the same functionality as traditional network components implemented through dedicated hardware. For example, a VNF 1134 may include components to perform any suitable NFV workloads, such as virtualized evolved packet core (vEPC) components, mobility management entities (MMEs), 3rd Generation Partnership Project (3GPP) control and data plane components, etc.

SFC 1136 is a group of VNFs 1134 organized as a chain to perform a series of operations, such as network packet processing operations. Service function chaining may provide the ability to define an ordered list of network services (e.g., firewalls and load balancers) that are stitched together in the network to create a service chain.

A hypervisor 1120 (also known as a virtual machine monitor) may comprise logic to create and run guest systems 1122. The hypervisor 1120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 1110. Services of hypervisor 1120 may be provided by virtualizing in software or through hardware assisted resources that require minimal software intervention, or both. Multiple instances of a variety of guest operating systems may be managed by the hypervisor 1120. Each platform 1102 may have a separate instantiation of a hypervisor 1120.

Hypervisor 1120 may be a native or bare-metal hypervisor that runs directly on platform logic 1110 to control the platform logic and manage the guest operating systems. Alternatively, hypervisor 1120 may be a hosted hypervisor that runs on a host operating system and abstracts the guest operating systems from the host operating system. Hypervisor 1120 may include a virtual switch 1138 that may provide virtual switching and/or routing functions to virtual machines of guest systems 1122. The virtual switch 1138 may comprise a logical switching fabric that couples the vNICs of the virtual machines 1132 to each other, thus creating a virtual network through which virtual machines may communicate with each other.

Virtual switch 1138 may comprise a software element that is executed using components of platform logic 1110. In various embodiments, hypervisor 1120 may be in communication with any suitable entity (e.g., a SDN controller) which may cause hypervisor 1120 to reconfigure the parameters of virtual switch 1138 in response to changing conditions in platform 1102 (e.g., the addition or deletion of virtual machines 1132 or identification of optimizations that may be made to enhance performance of the platform).

Hypervisor 1120 may also include resource allocation logic 1144, which may include logic for determining allocation of platform resources based on the telemetry data (which may include stress information). Resource allocation logic 1144 may also include logic for communicating with various components of platform logic 1110 entities of platform 1102A to implement such optimization, such as components of platform logic 1110.

Any suitable logic may make one or more of these optimization decisions. For example, system management platform 1106; resource allocation logic 1144 of hypervisor 1120 or other operating system; or other logic of computer platform 1102A may be capable of making such decisions. In various embodiments, the system management platform 1106 may receive telemetry data from and manage workload placement across multiple platforms 1102. The system management platform 1106 may communicate with hypervisors 1120 (e.g., in an out-of-band manner) or other operating systems of the various platforms 1102 to implement workload placements directed by the system management platform.

The elements of platform logic 1110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the computer platform 1102A may be coupled together in any suitable manner such as through one or more networks 1108. A network 1108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 12:
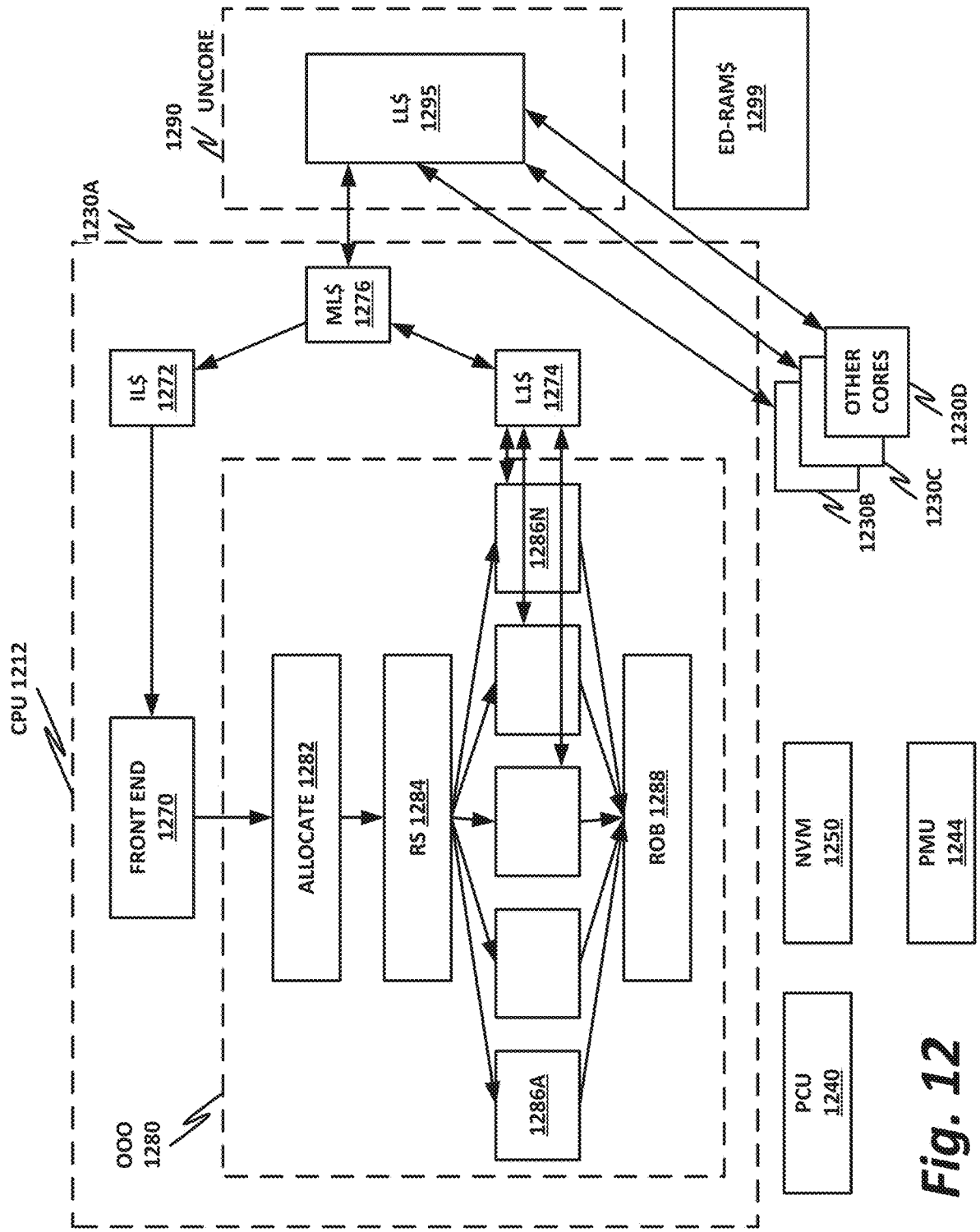
FIG. 12 is a block diagram of a central processing unit (CPU).

FIG. 12 illustrates a block diagram of a CPU 1212. Although CPU 1212 depicts a particular configuration, the cores and other components of CPU 1212 may be arranged in any suitable manner. CPU 1212 may comprise any processor or processing device, such as a microprocessor, an embedded processor, a digital signal processor (DSP), a network processor, an application processor, a coprocessor, a system-on-a-chip (SoC), or other device to execute code. CPU 1212, in the depicted embodiment, includes four processing elements (cores 1230 in the depicted embodiment), which may include asymmetric processing elements or symmetric processing elements. However, CPU 1212 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 1230A includes an out-of-order processor that has a front end unit 1270 used to fetch incoming instructions, perform various processing (e.g., caching, decoding, branch predicting, etc.) and passing instructions/operations along to an out-of-order (OOO) engine. The OOO engine performs further processing on decoded instructions.

A front end 1270 may include a decode module coupled to fetch logic to decode fetched elements. Fetch logic, in one embodiment, includes individual sequencers associated with thread slots of cores 1230. Usually, a core 1230 is associated with a first ISA, which defines/specifies instructions executable on core 1230. Often, machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 1230, in one embodiment, recognize the same ISA (or a subset thereof). Alternatively, in a heterogeneous core environment, a decoder of one or more cores (e.g., core 1230B) may recognize a second ISA (either a subset of the first ISA or a distinct ISA).

In the embodiment depicted, the out-of-order engine includes an allocate unit 1282 to receive decoded instructions, which may be in the form of one or more microinstructions or uops, from front end unit 1270, and allocate them to appropriate resources such as registers and so forth. Next, the instructions are provided to a reservation station 1284, which reserves resources and schedules them for execution on one of a plurality of execution units 1286A-1286N. Various types of execution units may be present, including, for example, arithmetic logic units (ALUs), load and store units, vector processing units (VPUs), and floating point execution units, among others. Results from these different execution units are provided to a reorder buffer (ROB) 1288, which take unordered results and return them to correct program order.

In the embodiment depicted, both front end unit 1270 and out-of-order engine 1280 are coupled to different levels of a memory hierarchy. Specifically shown is an instruction level cache 1272, that in turn couples to a mid-level cache 1276, that in turn couples to a last level cache 1295. In one embodiment, last level cache 1295 is implemented in an on-chip (sometimes referred to as uncore) unit 1290. Uncore 1290 may communicate with system memory 1299, which, in the illustrated embodiment, is implemented via embedded DRAM (eDRAM). The various execution units 1286 within OOO engine 1280 are in communication with a first level cache 1274 that also is in communication with mid-level cache 1276. Additional cores 1230B-1230D may couple to last level cache 1295 as well.

In particular embodiments, uncore 1290 may be in a voltage domain and/or a frequency domain that is separate from voltage domains and/or frequency domains of the cores. That is, uncore 1290 may be powered by a supply voltage that is different from the supply voltages used to power the cores and/or may operate at a frequency that is different from the operating frequencies of the cores.

CPU 1212 may also include a power control unit (PCU) 1240. In various embodiments, PCU 1240 may control the supply voltages and the operating frequencies applied to each of the cores (on a per-core basis) and to the uncore. PCU 1240 may also instruct a core or uncore to enter an idle state (where no voltage and clock are supplied) when not performing a workload.

In various embodiments, PCU 1240 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 1240 may detect stress characteristics at any suitable interval.

In various embodiments, PCU 1240 is a component that is discrete from the cores 1230. In particular embodiments, PCU 1240 runs at a clock frequency that is different from the clock frequencies used by cores 1230. In some embodiments where the PCU is a microcontroller, PCU 1240 executes instructions according to an ISA that is different from an ISA used by cores 1230.

CPU 1212 may also include a performance monitoring unit (PMU) 1244. As discussed in the present disclosure, PMU 1244 may generate interrupts on some selected or relevant performance counters. When a PMU interrupt is triggered by these counters, various artifacts of running code, such as assembly sequence, opcodes, stack arguments, branches, register values, and exception records, by way of nonlimiting example, may then be correlated to the artifacts to find a pattern. When it is found that the pattern closely resembles a flush reload cache side channel attack, such as code sequencing, or a Meltdown-style attack, then the process may be designated as malicious and remedial action may be taken.

In various embodiments, CPU 1212 may also include a nonvolatile memory 1250 to store stress information (such as stress characteristics, incremental stress values, accumulated stress values, stress accumulation rates, or other stress information) associated with cores 1230 or uncore 1290, such that when power is lost, the stress information is maintained.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in an SoC, including CPU package. An SoC represents an integrated circuit (IC) that integrates components of a computer or other electronic system into a single chip. Thus, for example, client devices 810 or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in ASICs, field-programmable gate arrays (FPGAs), and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 910, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read-only memory (EPROM), an electrically erasable programmable read-only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 950 may store information in any suitable type of tangible, non-transitory storage medium (for example, RAM, ROM, FPGA, EPROM, electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 920 and storage 950, should be construed as being encompassed within the broad terms 'memory' and 'storage,' as appropriate. A non-transitory storage medium herein is expressly intended to include any non-transitory, special-purpose or programmable hardware configured to provide the disclosed operations, or to cause a processor such as processor 910 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, a computing apparatus, comprising: a hardware platform comprising a performance monitoring unit (PMU); and one or more tangible, non-transitory computer-readable mediums having stored thereon executable instructions to provide a kernel-space threat detection engine to: receive a PMU event; correlate the PMU event to a computer security threat comprising extracting artifacts from the PMU event, and correlating the artifacts to an artifact profile for a known attack; and identify a process associated with the PMU event as a potential attack.

There is further disclosed an example of the computing apparatus, wherein the known attack is a flush reload side channel attack.

There is further disclosed an example of the computing apparatus, wherein the flush reload side channel attack is a Meltdown exploit.

There is further disclosed an example of the computing apparatus, wherein the PMU event is a PMU interrupt.

There is further disclosed an example of the computing apparatus, wherein the kernel space threat detection engine is further to interrupt execution of the potential attack.

There is further disclosed an example of the computing apparatus, wherein the kernel space threat detection engine is further to inject remedial code.

There is further disclosed an example of the computing apparatus, wherein the kernel space threat detection engine is further to disassemble code before and after the PMU event.

There is further disclosed an example of the computing apparatus, wherein the kernel space threat detection engine is further to enqueue metadata from the PMU event.

There is further disclosed an example of the computing apparatus, wherein the kernel space threat detection engine is further to register the PMU event with the PMU.

There is further disclosed an example of the computing apparatus, further comprising one or more tangible, non-transitory computer-readable mediums having stored thereon executable instructions to provide a policy engine to enforce a remediation policy for the attack.

There is further disclosed an example of the computing apparatus, wherein the policy engine is a kernel-space policy engine.

There is further disclosed an example of the computing apparatus, wherein the policy engine is a user-space policy engine.

There is further disclosed the computing apparatus of a number of the above examples, wherein the PMU event is a cache miss.

There is further disclosed the computing apparatus of a number of the above examples, wherein the PMU event is an RTM_Abort event.

There are also disclosed one or more tangible, non-transitory computer-readable storage mediums having stored thereon executable instructions to: communicatively couple to a performance monitoring unit (PMU); receive a PMU event from the PMU; extract artifacts from the PMU event, and correlate the artifacts to an artifact profile for a known attack; and identify a process associated with the PMU event as a potential security threat.

There are further disclosed the one or more tangible, non-transitory computer-readable storage mediums, wherein the known attack is a flush reload side channel attack.

There are further disclosed the one or more tangible, non-transitory computer-readable storage mediums, wherein the flush reload side channel attack is a Meltdown exploit.

There are further disclosed the one or more tangible, non-transitory computer-readable storage mediums, wherein the PMU event is a PMU interrupt.

There are further disclosed the one or more tangible, non-transitory computer-readable storage mediums, wherein the instructions are further to interrupt execution of the potential security threat.

There are further disclosed the one or more tangible, non-transitory computer-readable storage mediums, wherein the instructions are further to inject remedial code.

There are further disclosed the one or more tangible, non-transitory computer-readable storage mediums, wherein the instructions are further to disassemble code before and after the PMU event.

There are further disclosed the one or more tangible, non-transitory computer-readable storage mediums, wherein the instructions are further to enqueue metadata from the PMU event.

There are further disclosed the one or more tangible, non-transitory computer-readable storage mediums, wherein the instructions are further to register the PMU event with the PMU.

There are further disclosed the one or more tangible, non-transitory computer-readable storage mediums, wherein the instructions are further to provide a policy engine to enforce a remediation policy for the attack.

There are further disclosed the one or more tangible, non-transitory computer-readable storage mediums, wherein the policy engine is a kernel-space policy engine.

There are further disclosed the one or more tangible, non-transitory computer-readable storage mediums, wherein the policy engine is a user-space policy engine.

There are further disclosed the one or more tangible, non-transitory computer-readable storage mediums of a number of the above examples, wherein the PMU event is a cache miss.

There are further disclosed the one or more tangible, non-transitory computer-readable storage mediums of a number of the above examples, wherein the PMU event is an RTM_Abort event.

There is also disclosed a method of remediating a potential security threat in a computing device, comprising: communicatively coupling to a performance monitoring unit (PMU); receiving a PMU event from the PMU; extracting artifacts from the PMU event, and correlating the artifacts to an artifact profile for a known attack; and identifying a process associated with the PMU event as a potential security threat.

There is further disclosed the method, wherein the known attack is a flush reload side channel attack.

There is further disclosed the method, wherein the flush reload side channel attack is a Meltdown exploit.

There is further disclosed the method, wherein the PMU event is a PMU interrupt.

There is further disclosed the method, further comprising interrupting execution of the potential security threat.

There is further disclosed the method, further comprising injecting remedial code.

There is further disclosed the method, further comprising disassembling code before and after the PMU event.

There is further disclosed the method, further comprising enqueueing metadata from the PMU event.

There is further disclosed the method, further comprising registering the PMU event with the PMU.

There is further disclosed the method, further comprising providing a policy engine to enforce a remediation policy for the attack.

There is further disclosed the method, wherein the policy engine is a kernel-space policy engine.

There is further disclosed the method, wherein the policy engine is a user-space policy engine.

There is further disclosed the method of a number of the above examples, wherein the PMU event is a cache miss.

There is further disclosed the method of a number of the above examples, wherein the PMU event is an RTM_Abort event.

What is claimed is:

1. A computing apparatus, comprising:
   a hardware platform comprising a performance monitoring unit (PMU); and
   one or more tangible, non-transitory computer-readable mediums having stored thereon executable instructions to provide a kernel space threat detection engine to:
   program the PMU to report Level 3 cache (L3) miss counter (L3 MISS) overflow and restricted transactional memory (RTM) aborted counter (RTM ABORTED) overflow events;
   receive a PMU reporting event of an L3 MISS or RTM ABORTED overflow;
   responsive to the reporting, extract artifacts from the event, including a process associated with the event, and correlate the artifacts to an artifact profile for a known attack; identify the process an attack candidate; and
   take a remedial action responsive to the attack candidate.

2. The computing apparatus of claim 1, wherein the known attack is a flush reload side channel attack.

3. The computing apparatus of claim 2, wherein the flush reload side channel attack is a Meltdown exploit.

4. The computing apparatus of claim 1, wherein the PMU event is a PMU interrupt.

5. The computing apparatus of claim 1, wherein the kernel space threat detection engine is further to interrupt execution of the attack candidate.

6. The computing apparatus of claim 5, wherein the kernel space threat detection engine is further to inject remedial code.

7. The computing apparatus of claim 1, wherein the kernel space threat detection engine is further to disassemble code before and after the PMU event.

8. The computing apparatus of claim 1, wherein the kernel space threat detection engine is further to enqueue metadata from the PMU event.

9. The computing apparatus of claim 1, wherein the kernel space threat detection engine is further to register the PMU event with the PMU.

10. The computing apparatus of claim 1, further comprising one or more tangible, non-transitory computer-readable mediums having stored thereon executable instructions to provide a policy engine to enforce a remediation policy for the attack candidate.

11. The computing apparatus of claim 10, wherein the policy engine is a kernel-space policy engine.

12. The computing apparatus of claim 10, wherein the policy engine is a user-space policy engine.

13. The computing apparatus of claim 1, wherein the PMU event is a cache miss.

14. One or more tangible, non-transitory computer-readable storage mediums having stored thereon executable instructions to:
    communicatively couple to a performance monitoring unit (PMU);
    configure the PMU to disseminate Level 3 cache (L3) miss counter (L3 MISS) and restricted transactional memory (RTM) aborted counter (RTM ABORTED) excess flow events;
    receive a PMU reporting event of an L3 MISS or RTM ABORTED excess flow from the PMU;
    responsive to the reporting event, extract artifacts from the event, including an operation associated with the event, and correlate the artifacts to an artifact profile for a known attack; identify the operation as a potential security threat; and
    take a remedial action responsive to the potential security threat.

15. The one or more tangible, non-transitory computer-readable mediums of claim 14, wherein the known attack is a flush reload side channel attack.

16. The one or more tangible, non-transitory computer-readable mediums of claim 14, wherein the instructions are further to interrupt execution of the potential security threat.

17. The one or more tangible, non-transitory computer-readable mediums of claim 14, wherein the instructions are further to inject remedial code.

18. A method of remediating a potential security threat in a computing device, comprising:
    communicatively coupling to a performance monitoring unit (PMU);
    programming the PMU to notify an administrator of L3 miss counter (L3 MISS) and restricted transactional memory (RTM) aborted counter (RTM ABORTED) overrun events;
    receiving a PMU notification of an Level 3 cache (L3) MISS or RTM ABORTED overrun event from the PMU;
    responsive to the notification, extracting artifacts from the overrun event, including a process associated with the event, and correlating the artifacts to an artifact profile for a known attack;
    identifying the process as a security threat candidate; and
    taking a remedial action responsive to the security threat candidate.

19. The method of claim 18, wherein the known attack is a flush reload side channel attack.

20. The method of claim 19, wherein the flush reload side channel attack is a Meltdown exploit.

* * * * *

UNITED STATES PATENT AND TRADEMARK OFFICE
CERTIFICATE OF CORRECTION

PATENT NO. : 10,902,123 B2  
APPLICATION NO. : 16/048478  
DATED : January 26, 2021  
INVENTOR(S) : Carl D. Woodward et al.

Page 1 of 1

It is certified that error appears in the above-identified patent and that said Letters Patent is hereby corrected as shown below:

In the Claims

In Column 27, Line 24, in Claim 1, after "process", insert -- as --.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*